United States Patent [19]
Kume

[11] 3,869,574
[45] Mar. 4, 1975

[54] BELT CONVEYOR APPARATUS
[75] Inventor: Takeshi Kume, Kobe, Japan
[73] Assignee: Ryuichi Mujamoto, Osaka, Japan
[22] Filed: Oct. 17, 1972
[21] Appl. No.: 300,417

[30] Foreign Application Priority Data
Mar. 6, 1972 Japan............................ 47-22871

[52] U.S. Cl. .............................................. 198/203
[51] Int. Cl............................................. B65g 23/00
[58] Field of Search........................... 198/203, 191

[56] References Cited
UNITED STATES PATENTS
| | | | |
|---|---|---|---|
| 1,497,619 | 6/1924 | Waechter et al. | 198/203 |
| 2,732,930 | 1/1956 | Thomson | 198/203 X |
| 2,759,596 | 8/1956 | Keller | 198/203 X |
| 2,863,555 | 12/1958 | Jaritz | 198/191 X |
| 3,015,381 | 1/1962 | Mahwinkel et al. | 198/203 |
| 3,268,065 | 8/1966 | Thomson | 198/203 |
| 3,682,295 | 8/1972 | Roinestad | 198/203 |

FOREIGN PATENTS OR APPLICATIONS
1,112,884   3/1956   France................................ 198/191

Primary Examiner—Evon C. Blunk
Assistant Examiner—Douglas D. Watts
Attorney, Agent, or Firm—Wenderoth, Lind & Ponack

[57] ABSTRACT

A belt conveyor apparatus comprises a major belt on which cargoes are carried and a plurality of sub-belt devices arranged successively along the length of said major belt. Each of said sub-belt devices has a driving pulley, a following pulley, a sub-belt, and a number of carrier rollers. These sub-belt devices are in close contact with the major belt for supporting and driving the conveyor belt. As a result, the conveyor is suitable for the long distance transportation of cargo.

7 Claims, 4 Drawing Figures

BELT CONVEYOR APPARATUS

BACKGROUND OF THE INVENTION

The present invention relates to a conveyor apparatus wherein a major carrying belt is supported and driven by a plurality of driving sub-belt devices so as to make the conveyor suitable for long distance transportation.

Prior art conveyor systems used for long distance transportation conventionally employ several independent conveyors arranged successively in a line. These multi-conveyor systems, however, have the fundamental disadvantage that the conveyed cargoes must be transshipped or dropped on subsequent conveyors at the several conveyor junctions, whereby the cargoes are apt to be injured or damaged.

Therefore, it is desirable to provide a single conveyor with one long belt covering the entire distance. However, prior art single conveyor systems have another disadvantage when designed for long distance transportation. The conveyor belt dimensions must be increased not only in length, but also in sectional area because the belt tension and load are increased with the increase in transportation distance. This results in an extraordinary increase in belt weight and required driving power. This increase is in the manner of a geometric progression.

SUMMARY OF THE INVENTION

It is an object of the present invention to overcome the above-mentioned disadvantages of a single conveyor system by arranging several driving sub-belt devices successively along a major carrying belt.

It is another object of the present invention to reduce the sectional area of the major belt by arranging the sub-belt devices to support and drive the major belt successively.

It is a further object of the present invention to prevent the sub-belt devices from slipping on the major belt by catching and pinching the major belt in the sub-belt devices.

BRIEF DESCRIPTION OF THE DRAWINGS

Additional objects and advantages of the invention will become apparent from the following description considered together with the accompanying drawings, in which.

DETAILED DESCRIPTION OF THE INVENTION

Figure 1:
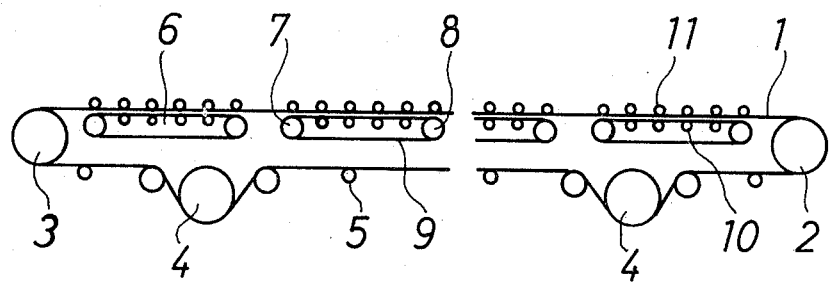
FIG. 1 is a side view of a conveyor apparatus, illustrating a preferred embodiment of the present invention.

Referring now to the drawings, a major belt 1 having a long span is movably supported between two spaced apart guide rollers 2 and 3. Take-up rollers 4 and return rollers 5 are provided in the usual manner at the under part of the belt 1. In the upper part of the major belt 1 there are provided several sub-belt devices 6 successively arranged along the belt 1. Each sub-belt device 6 is preferably provided with a driving pulley 7, a following pulley 8, a driving sub-belt 9, and several carrier rollers 10. The sub-belt 9 are arranged face to face with the carrying major belt 1 so that the major belt 1 is to be driven by frictional transmission with the sub-belts 9. Each sub-belt device 6 is also provided with a plurality of snap-rollers 11 which engage the side edges of the major belt 1 so as to insure the above-mentioned frictional transmission, as explained in the following description.

In general, frictional force is proportional to the vertical contacting force without regard to the amount of the contacting area. Therefore, it is not necessary for the sub-belts 9 to contact the entire area of the major belt 1. For example, in the event that the conveyor is being used to carry automobiles, sufficient frictional transmission can be obtained between the major belt 1 and narrow sub-belts 9 positioned under the wheels of the automobile.

However, the frictional transmission force will vary with the local cargo load which is subject to fluctuate when the conveyed cargoes are distributed unevenly or intermittently over the major belt 1. For example, when an automobile is being carried over a long distance, only the sub-belt device 6 directly under the automobile being carried is used to drive the major belt 1 by the cargo load, while the other sub-belt devices 6 do not aid in the driving of the major belt 1. This results in an overload of the sub-belt device 6 beneath the automobile. Furthermore, when the automobile is positioned at a point midway between two sub-belt devices 6 after passing over the driving sub-belt device 6, none of the sub-belt devices 6 are operable to drive the major belt 1, which results in the defect that the automobile cannot be conveyed.

In order to avoid the above-mentioned defects, a snap roller 11 is arranged on each sub-belt device 6 at a position over the driving pulley 7, the following pulley 8 and/or the carrier rollers 10 so as to press on each side edge of the major belt 1 under which a sub-belt 9 is positioned. In this manner, the major belt 1 and the sub-belt 9 are pinched between the snap roller 11 and the driving pulley 7, the following pulley 8 or the carrier rollers 10.

Figure 4:
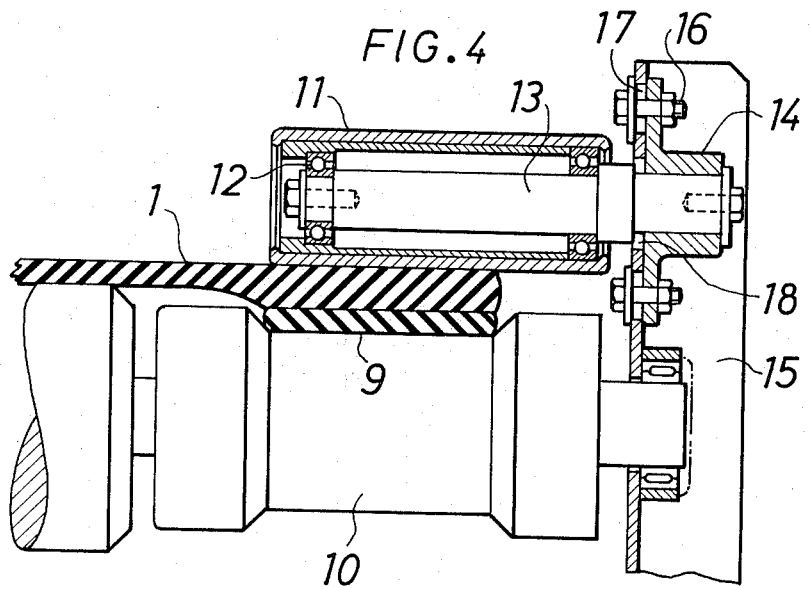
FIG. 4 is a fragmental enlarged cross-sectional view of the conveyor apparatus, illustrating a specified feature of a sub-belt device.

The snap roller 11 may have a structure as shown in FIG. 4. A shaft 13 holds the snap roller 11 rotatably by a bearing 12 at one end and a coupling 14 supports the other end of the shaft 13 and is bolted to the frame 15 of the sub-belt device 6 so as to be vertically adjustable by the use of vertically elongated holes 17 and 18 in the frame 15. Alternatively, the snap roller 11 may be constructed so that the shaft 13 is eccentrically supported by coupling 14 so as to be fixed at a selected position in a vertical range which is adjustable by rotating the shaft 13 with respect to the coupling 14.

In accordance with the invention, a snap roller 11 is positioned at each sub-belt device 6 so as to rotatably contact the major belt 1 with a suitable pressure, whereby it is possible to obtain a sufficient frictional transmission force between the major belt 1 and the sub-belt 9 by the snapping load, regardless of the loading condition of the conveyed cargoes being carried on the major belt 1.

As a result, the frictional transmission force is kept substantially constant so that the conveyed cargoes can be transported smoothly with a steady speed. In addition, the driving sub-belt devices 6 can be distributed at proper intervals and low power driving motors can be used which equally divide the power necessary to drive the conveyor apparatus.

In the present invention, furthermore, the major belt 1 is driven by each sub-belt device 6 so that the tension of the major belt 1 is evenly distributed in small values corresponding to the divided power of each sub-belt device 6. As a result, the sectional area and the unit weight of the major belt 1 have a constant small value, regardless of the transportation distance. The instant invention thus makes it possible to convey cargoes with one single continuous major belt over distances of hundreds of miles, without the necessity of very heavy belts and high power motors of prior art long distance conveyor apparatus.

Figure 2:
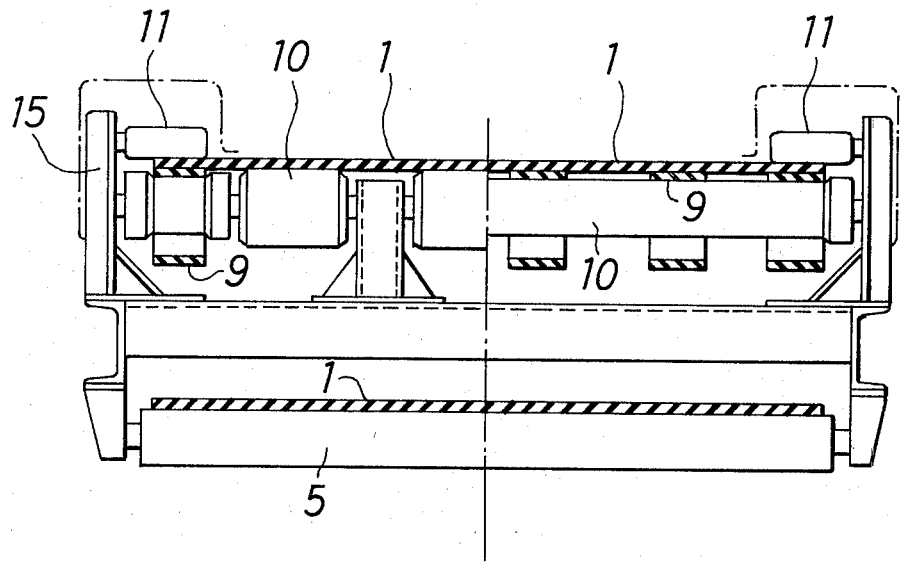
FIG. 2 is a cross-sectional view of the conveyor apparatus being provided with a flat belt.
Figure 3:
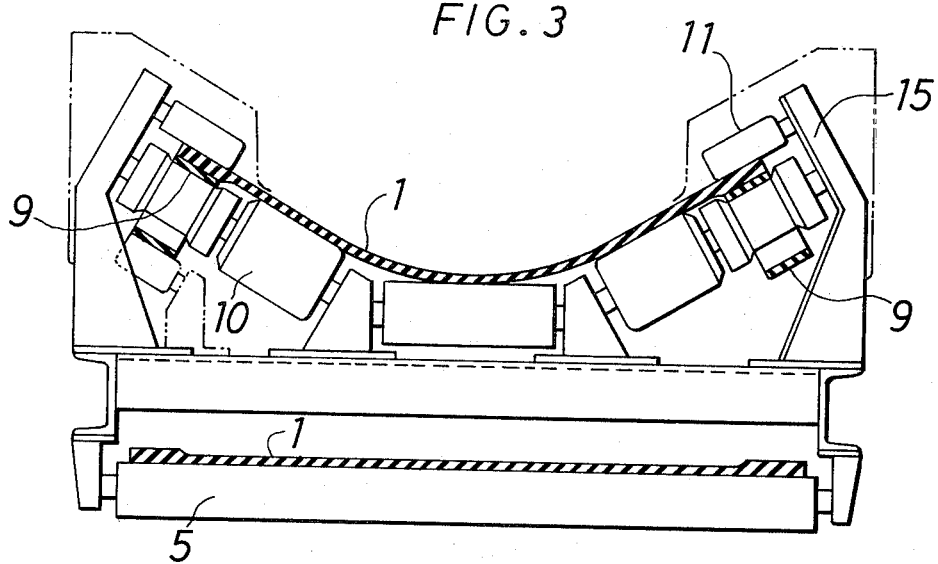
FIG. 3 is a cross-sectional view of the conveyor apparatus being provided with a trough shaped belt.

The belt conveyor apparatus of the present invention may be used for flat belt systems, as shown in FIG. 2, or for trough shaped belt systems, as shown in FIG. 4. The flat belt system is useful in heavy loading conditions, such as in the transportation of heavy machinery, vehicles or packaged cargo containers, while the trough belt system is useful in light loading conditions such as in the transportation of powder, grain or bulk cargoes. In this trough belt system, however, a tendency exists to stretch transversely in a flat form between the carrier rollers 10 which sustain the trough belt in a U form. This results in a waving action of the trough belt during its transportation.

Therefore, in accordance with the present invention, the major belt 1 is formed to have a thinner thickness at the middle part thereof than at the side margin parts. These side parts are thick enough to bear the driving tension, while the middle part is thick enough to support the cargoes. In this manner, transverse stretching and waving action of the major belt 1 is prevented, whereby it is possible to prevent bulk cargoes from falling off during transportation. In addition, it is also possible to reduce the sectional area and weight of the major belt 1 and the driving power necessary for the conveyor apparatus. This embodiment of the apparatus can be used for example for long distance transportation of dirt, garbage or sand in reclamation systems.

The present invention is not to be restricted to the details set forth above, since these may be modified within the scope of the appended claims without departing from the spirit and scope of the invention.

What is claimed is:

1. A belt conveyor apparatus comprising:
   an endless major belt having at each opposite lateral edge portion thereof, on the underside of the upper run thereof, a single substantially flat contact surface, said lateral edge portions being thicker than the middle portion between said lateral edge portions;
   non-driven guide rollers mounted for supporting said endless major belt;
   a plurality of sub-belt means mounted for contacting said major belt at said opposite lateral edge portion contact surfaces only thereof for imparting rotation to said major belt, each of said sub-belt means comprising, adjacent each of said lateral edge portions of said major belt:
   a driving pulley
   a following pulley;
   a sub-belt having a single outer substantially flat contact surface and mounted over said driving and following pulleys to be driven by said driving pulley, said sub-belt being substantially narrower than said major belt and being mounted to be in strong frictional contact at said flat contact surface thereof with the respective one of said lateral edge portion contact surfaces only of said major belt; and
   at least one snap roller means mounted to contact the upper side of said upper run of said major belt at said respective lateral edge portion only thereof, said snap roller means comprising a freely rotatably mounted snap roller for pinching said major belt and said sub-belt together;
   the lateral edge surfaces of said major belt being free from contact with said sub-belt means; and
   said sub-belt means being spaced from and not in contact with the lower run of said major belt.

2. A belt conveyor apparatus as claimed in claim 1, wherein each of said sub-belt means further comprises at least one carrier roller positioned between each of said driving and following pulleys below the upper run of said sub-belt.

3. A belt conveyor apparatus as claimed in claim 2, wherein said snap roller is positioned such that said major belt and said sub-belt are pinched between said snap roller and said carrier roller.

4. A belt conveyor apparatus as claimed in claim 2, wherein each of said sub-belt means includes a plurality of said snap rollers positioned to pinch said major belt and said sub-belt between one of said snap rollers and each of said driving pulley, said following pulley and said carrier roller.

5. A belt conveyor apparatus as claimed in claim 1, wherein said snap roller is positioned such that said major belt and said sub-belt are pinched between said snap roller and said driving pulley.

6. A belt conveyor apparatus as claimed in claim 1, wherein said snap roller is positioned such that said major belt and said sub-belt are pinched between said snap roller and said following pulley.

7. A belt conveyor apparatus as claimed in claim 1, wherein each of said snap rollers is adjustably mounted in a direction perpendicular to the surface of said major belt.

* * * * *